US011059414B2

(12) United States Patent
Dorn (10) Patent No.: US 11,059,414 B2
(45) Date of Patent: Jul. 13, 2021

(54) PICKUP TRUCK

(71) Applicant: ERWIN HYMER GROUP SE, Bad Waldsee (DE)

(72) Inventor: Guenter Dorn, Schlier (DE)

(73) Assignee: Erwin Hymer Group SE, Bad Waldsee (DE)

( * ) Notice: Subject to any disclaimer, the term of this patent is extended or adjusted under 35 U.S.C. 154(b) by 0 days.

(21) Appl. No.: 16/374,994

(22) Filed: Apr. 4, 2019

(65) Prior Publication Data

US 2019/0225135 A1      Jul. 25, 2019

Related U.S. Application Data

(63) Continuation of application No. PCT/EP2018/060001, filed on Apr. 19, 2018.

(30) Foreign Application Priority Data

Apr. 21, 2017   (DE) .................... 10 2017 108 554.8

(51) Int. Cl.
*B60P 3/34* (2006.01)
*E04H 15/06* (2006.01)
*E04H 15/20* (2006.01)
*B62D 33/027* (2006.01)

(52) U.S. Cl.
CPC .............. *B60P 3/341* (2013.01); *E04H 15/06* (2013.01); *E04H 15/20* (2013.01); *B62D 33/0273* (2013.01)

(58) Field of Classification Search
None
See application file for complete search history.

(56) References Cited

U.S. PATENT DOCUMENTS

| 3,658,375 | A | | 4/1972 | Bowen | |
|---|---|---|---|---|---|
| 4,294,484 | A | * | 10/1981 | Robertson | B60P 3/34 135/88.13 |
| 4,328,989 | A | | 5/1982 | Childers | |
| 5,188,414 | A | | 2/1993 | Burnham et al. | |
| 5,213,390 | A | * | 5/1993 | Borchers | B60P 3/341 296/100.06 |
| 5,558,392 | A | * | 9/1996 | Young | B60P 3/36 224/553 |
| 5,924,761 | A | * | 7/1999 | Harrison | B60P 3/341 135/88.05 |
| 5,957,525 | A | * | 9/1999 | Nelson | B60P 3/341 296/100.06 |
| 6,604,777 | B2 | * | 8/2003 | Neville | B60P 3/341 296/164 |
| 6,712,422 | B1 | * | 3/2004 | Vaillancourt | B60P 3/341 296/164 |

(Continued)

FOREIGN PATENT DOCUMENTS

DE      20 2006 012 521 U1     11/2006

*Primary Examiner* — Lori L Lyjak
(74) *Attorney, Agent, or Firm* — Burr & Brown, PLLC (57) ABSTRACT

The present invention relates to a pickup truck or similar vehicle comprising a cargo area, furthermore comprising a passenger compartment with a roof, the cargo area being located behind the passenger compartment in the direction of travel, wherein the cargo area comprises lateral boundaries and wherein the cargo area has a covering element. It is provided that the covering element comprises a tent, wherein the tent can be inflated or unfolded.

18 Claims, 4 Drawing Sheets

(56) References Cited

U.S. PATENT DOCUMENTS

| | | | | |
|---|---|---|---|---|
| 6,749,252 B2* | 6/2004 | Cervenka | ............... | B60P 3/341 |
| | | | | 296/165 |
| 7,527,318 B2* | 5/2009 | Geise | ...................... | B60P 3/341 |
| | | | | 296/100.06 |
| 9,156,391 B2* | 10/2015 | Loranger | ................ | B60P 3/341 |
| 9,205,881 B2* | 12/2015 | Vandergon | ............. | B62B 13/18 |
| 9,278,640 B2* | 3/2016 | Badger | .................. | B60P 3/341 |
| 10,596,951 B1* | 3/2020 | Williams | ................ | E04H 15/06 |
| 10,745,932 B1* | 8/2020 | Currid | ................... | E04H 15/324 |
| 2002/0008406 A1 | 1/2002 | Phillips et al. | | |
| 2002/0163221 A1 | 11/2002 | Smith | | |
| 2005/0076584 A1 | 4/2005 | Loranger | | |
| 2008/0210282 A1* | 9/2008 | Turcot | ................... | E04H 15/06 |
| | | | | 135/88.14 |
| 2011/0204672 A1* | 8/2011 | Herndon | ............. | B62D 35/007 |
| | | | | 296/100.06 |
| 2015/0197141 A1* | 7/2015 | Cortez | .................... | B60J 7/141 |
| | | | | 296/3 |
| 2016/0375816 A1* | 12/2016 | Harrison, Jr. | .......... | B60P 3/341 |
| | | | | 296/160 |
| 2019/0017287 A1* | 1/2019 | Currid | ................... | E04H 15/56 |
| 2019/0291630 A1* | 9/2019 | Fittro | ..................... | B60P 3/341 |

* cited by examiner

PICKUP TRUCK

CROSS REFERENCE TO RELATED APPLICATIONS

This application is a continuation of International Application No. PCT/EP2018/060001 filed Apr. 19, 2018, which designated the United States, and claims the benefit under 35 USC § 119(a)-(d) of German Application No. 10 2017 108 554.8 filed Apr. 21, 2017, the entireties of which are incorporated herein by reference.

FIELD OF THE INVENTION

The present invention relates to a pickup truck or similar vehicle comprising a cargo area and a passenger compartment with a roof located behind the cargo area. The present invention furthermore relates to a covering element.

BACKGROUND OF THE INVENTION

Pickup trucks are already known per se in the prior art, for example, from U.S. Pat. No. 5,188,414 A. Furthermore, it is known from the prior art that pickup trucks can be used as campers or motorhomes, e.g., by arranging a living cabin on their cargo areas, as is represented for example in DE 20 2006 012 521 U1.

The drawback to the use of such living cabins, in particular, on cargo areas of the pickup truck is that, on account of their usual dimensioning and especially their large weight, these generally need to be placed on the cargo area of a pickup truck and removed from it with increased outlay. This means that pickup trucks used in this way are limited in their flexible usability, i.e., for example, in routine use without a living cabin, etc. A further drawback to the known pickup trucks with living cabins is that such living cabins take up a lot of room for their stowage in the dismounted condition, i.e., a condition in which they are not located on the cargo area.

SUMMARY OF THE INVENTION

The problem which the present invention proposes to solve is to eliminate the mentioned drawbacks.

As the solution of the problem, a pickup truck or similar vehicle is proposed, comprising a cargo area and furthermore comprising a passenger compartment with a roof, the cargo area being located behind the passenger compartment in the direction of travel, wherein the cargo area comprises lateral boundaries and wherein the cargo area has a covering element.

The present invention is characterized in that the covering element comprises a tent in a receiving space, wherein the tent can be inflated and/or unfolded.

In this way, a pickup truck can be provided which can be quickly and easily outfitted or retrofitted as a camper, motorhome, etc. A further advantage over the use of rigid living cabins is that a tent is especially light and compact and thus can be more easily and better put up, taken down, and stowed.

An especially advantageous modification of the present invention may provide that the covering element comprises at least side walls and a top part, wherein at least one side wall and the cargo area and/or at least one side wall and at least one lateral boundary are releasably connectible. It can be made possible to be able to connect the covering element securely and reliably to the pickup truck. Moreover, this can prevent damaging of the covering element.

The present invention may also provide that the covering element has a box shape and comprises side walls and a top part. This can make possible an especially secure stowing of the tent in or within the covering element. Furthermore, such a covering element can be used as part of a living cabin.

Another advantageous embodiment of the present invention may provide that the covering element comprises at least one lifting mechanism. Thus, the covering element can be height adjustable, so that the covering element can be used in flexible manner as part of a living space cabin.

Preferably, in the context of the present invention, it may be provided that side walls of the covering element can be erected by at least one lifting mechanism.

Thanks to such a movability of side walls of the covering element, individual adjustments to the living space utilization of the covering element can be done. Furthermore, any height offset between two levels, that of the cargo area on the one hand and that of the roof on the other hand, can be adjustable in design, so that both cargo area and roof can be used as living space. In this way, a usable area which is larger than the cargo area of a pickup truck can be provided in especially easy and economical manner for use as living or sleeping area.

In another advantageous embodiment of the present invention, it may be provided that the covering element comprises at least one side wall, which is preferably formed from a variable-shape or similar flexible material. In this way, damage to the covering element can be prevented, e.g. under high mechanical strain, e.g. during compact storage.

The present invention may also provide that the covering element comprises a top side, which can be laid at least for a portion on the roof, in particular, it is releasably connectible to the roof.

Such a top side, which may also be viewed as being a cover, when arranged on a roof, makes it possible to use the roof or a surface of the roof also as a living or sleeping area. In this way, an enlarged living or sleeping area can be provided.

The present invention may provide in one preferred embodiment that the covering element comprises a top side, wherein the top side can be arranged preferably foldably on the roof, such that the tent, the roof and the cargo area are spatially interconnectible.

This represents a further possibility of using a roof of a pickup truck as a living or sleeping area. Thus, an increased usable area can be provided. Costly remodeling or retrofitting work on the pickup truck is likewise unnecessary, for example, if an existing roof railing is utilized.

In one modification of the present invention, it may be provided that the lifting mechanism is designed as a hydraulic cylinder.

A hydraulic cylinder makes it possible to generate large forces and torques in simple manner. In this way, the setting up of a living or sleeping area can be done especially quickly. Furthermore, hydraulic cylinders have a long service life and are very reliable, e.g. due to high positioning accuracy.

It is also possible for the lifting mechanism to be electrically operated. The advantage of an electrically operatable lifting mechanism is less maintenance expense.

While preserving the mentioned advantages, it is also possible in the context of the present invention for the lifting mechanism to be designed as a hydraulic cylinder and/or for the lifting mechanism to be able to be electrically operated.

One advantageous modification of the present invention may provide that the covering element comprises a compressed air generator and the lifting mechanism can be operated by compressed air.

In this way, by means of only a compressed air generator the tent can be erected by supplying air, i.e. by inflating it, and the covering element can be adjustable in height, so that the covering element can be usable flexibly as part of a living space cabin. Thus, the covering element can be especially compact in design, so that it can be stored in space saving manner, e.g. when not in use. The use of only one compressed air generator may also reduce the maintenance expense of the covering element.

One advantageous embodiment of the present invention may provide that the covering element comprises at least one plastic, preferably on a top side, preferably a thermoset plastic. Such a covering element can be easily and economically produced, e.g. by means of injection molding. Thermoset plastics contain amorphous polymers and have a very high stability. Accordingly, so too does the covering element or a top side of the covering element have a very high stability. Further advantages from the use of plastics in this regard are, for example, enhanced and long-lasting weather resistance of the covering element or protection of the covering element, especially the top side of the covering element, against UV radiation.

An especially advantageous embodiment of the present invention may provide that the tent can be secured by means of at least one fastener to the covering element and/or to the roof and/or to the cargo area. In this way, a secure and reliable connection of the tent to the vehicle can be provided. Damage to the tent may thus be prevented. Furthermore, unlike a pickup truck with a rigid construction, a simplified erecting of the tent on the pickup truck and optionally a correspondingly simplified dismantling of the tent are made possible.

The present invention may provide that the at least one fastener is designed as a weatherstrip rail. This constitutes a simple and flexible option of a fastener for a tent, which can furthermore prevent damage to the tent.

While preserving the mentioned advantages, it is also possible in the context of the present invention for the tent to be able to be secured by means of at least one fastener to the covering element and/or to the roof and/or to the cargo area, wherein the at least one fastener is preferably designed as a weatherstrip rail.

In one embodiment of the present invention, it is possible for the covering element, preferably a top side of the covering element, to comprise at least one damping mechanism made of preferably elastic material.

Insofar as it is provided that the top part in an opened condition can be arranged at least partly on the roof, this can prevent damage to the roof, such as paint damage, due to scratching by the top part, etc.

An especially advantageous modification of the present invention may provide that the tent has at least one fluid channel, especially an air channel, which is designed in particular as a statically relevant bracing of the tent.

By means of such a fluid channel, the tent can be put up in especially simple manner by filling the fluid channel with a fluid, such as air. Furthermore, a setting up and tearing down of the tent with a fluid channel is simplified, since it may sometimes by accomplished by a single person.

Thus, an erecting of the tent e.g. by filling with air can be done especially swiftly. The same holds for tearing down the tent. Furthermore, a tent with particularly good stability can be provided, so that the tent in the sense of the present invention can also be regarded as a living cabin, without this requiring costly remodeling work on the pickup truck. A living cabin designed as a tent with fluid channels is also particularly light and compact, as well as easily and economically retrofittable, and it can be stowed with little space requirement when not in use.

In a further advantageous embodiment of the present invention, it may also be provided that the tent is designed free of rigid static structures, especially tent poles.

In the sense of the present invention, by rigid static connections is meant, in particular, tent poles, etc. Thus, by foregoing such connections, an especially flexible tent can be provided, which can be erected more quickly and easily, free of predetermined dimensions, e.g., due to rods, etc., for example, by simple inflating of the tent. The same holds for the teardown of the tent, for example, by draining the air. Furthermore, the erecting of the tent or a tearing down of the tent by a single person can be made possible. Rigid static connections of tents, such as tent poles, etc., may furthermore become damaged and, for example, break, so that the tent can no longer be erected, or certain repair work needs to be done first.

One advantageous modification of the present invention may provide that the tent is arranged on at least two levels, wherein one level is defined by the cargo area and one level is defined by the roof and/or the at least two levels have a height offset.

In this way, it is possible to use both the roof and the cargo area as living space. An arrangement of the tent on two levels, in addition to creating further living and sleeping room, also makes possible a spatial separation in the tent. This means that the tent stretches over these two surfaces or these two levels.

The present invention may also provide that the covering element comprises a preferably foldable support mechanism. In this way, enhanced comfort of the covering element can be made possible when using it as a living or sleeping room.

The present invention, in particular, may also provide that a preferably foldable support mechanism can be hinged to the covering element and is preferably foldable in the direction of an inside of the top part of the covering element. Thus, an inside of a top part can also be utilized as a living or sleeping area with enhanced comfort, using the support mechanism as the floor in the tent.

An especially advantageous modification of the present invention may provide that the covering element comprises a drive unit, by means of which a top part of the covering element can swivel along a pivot axis, wherein the drive unit is preferably arranged in a support, which is arranged on the pivot axis or parallel to the pivot axis.

Thanks to such a drive unit, which can be protected against damage in a support, an especially simple and comfortable swiveling of the top part to provide a living and/or sleeping room is possible.

It is especially advantageous for the drive unit, designed, for example, as an electric motor and accordingly being economically available and reliable, to be able to swivel along with the swivel movement of the top part.

Thus, the present invention may provide that the drive unit is electrically operable. This can simplify the swiveling of the top part.

The present invention in one modification may also provide for the formation of a manual operating mechanism in addition to an electrically designed drive unit, which may be usable, in particular, when the electrical drive unit is not functional. Such a manual operating mechanism, i.e., a manually activatable operating mechanism, can be seen for example as an emergency locking or emergency unlocking.

The present invention furthermore relates to a covering element for a pickup truck or similar vehicle, comprising a cargo area. It may be provided that the covering element is designed according to the features of the specification and/or the patent claims.

BRIEF DESCRIPTION OF THE DRAWINGS

The present invention shall be explained more closely in the following with the aid of drawings. Further significant features and advantages of the present invention will emerge from the drawings and their description.

DETAILED DESCRIPTION OF THE INVENTION

Figure 1:
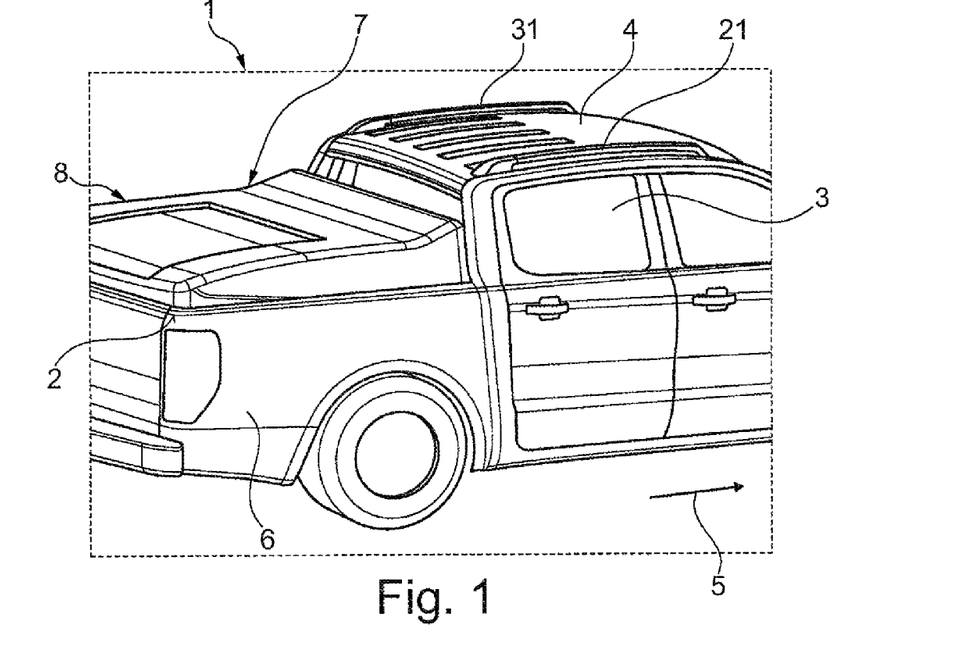
FIG. 1 is a schematic representation of one cutout view of a pickup truck in a position at rest.

FIG. 1 shows in schematic representation a cutout view of a pickup truck 1. The pickup truck 1 comprises a cargo area 2 and a passenger compartment 3 with a roof 4. The cargo area 2 is situated behind the passenger compartment 3 in the direction of travel 5 in familiar fashion. Moreover, the cargo area 2 comprises lateral boundaries 6, 7. The cargo area 2 further comprises a covering element 8 (also see FIG. 6 for this). The lateral boundaries 6, 7 may be viewed as being side walls. On the roof 4 there is arranged in familiar fashion a railing 21, 31 each time on a driver side and a passenger side.

Figure 2:
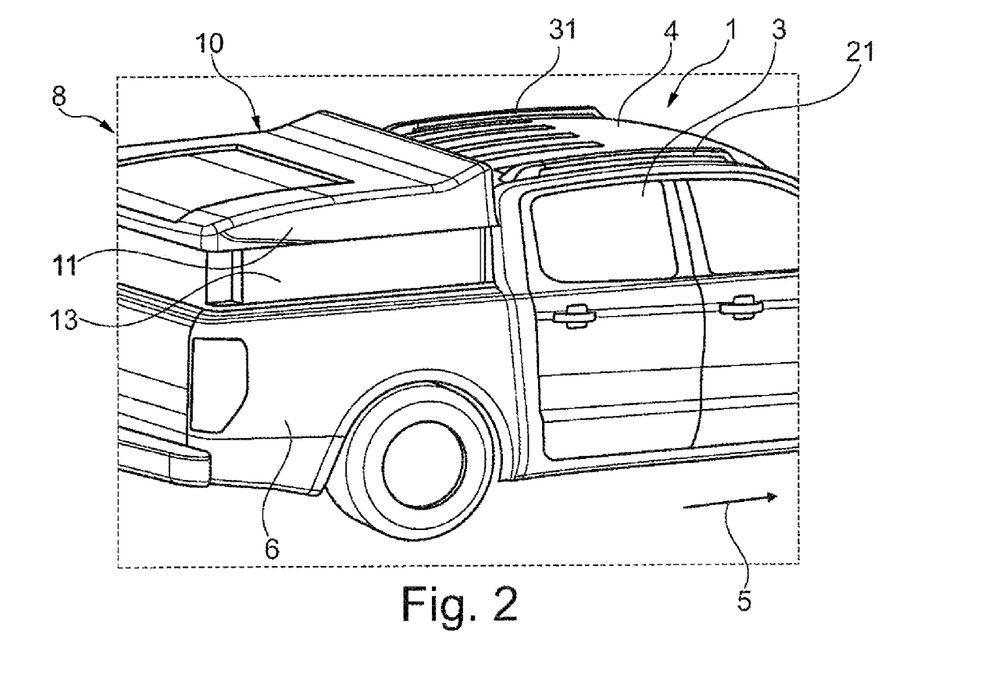
FIG. 2 is a schematic representation of one cutout view of a pickup truck in an intermediate position.
Figure 6:
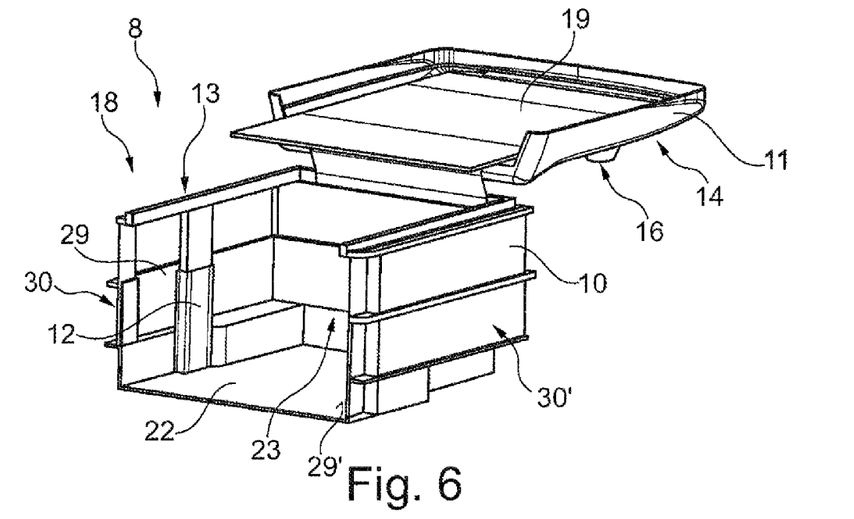
FIG. 6 is a schematic representation of a covering element.

FIG. 2 shows a schematic representation of a cutout view of pickup truck 1 in an intermediate position, in which the covering element 8 has been extended by lifting mechanism (see FIG. 6). This may also be interpreted in that the covering element 8 has been extended upward or in the direction of the roof 4.

It is evident that the covering element 8 comprises side walls 10, 13 as well as a top part 11. The covering element 8 in the present case is comparable to a chest. The covering element 8 may thus be box shaped or chest shaped, etc. Hence, the covering element 8 may have an especially compact design, so that when not in use reduced storage space is required.

Figure 3:
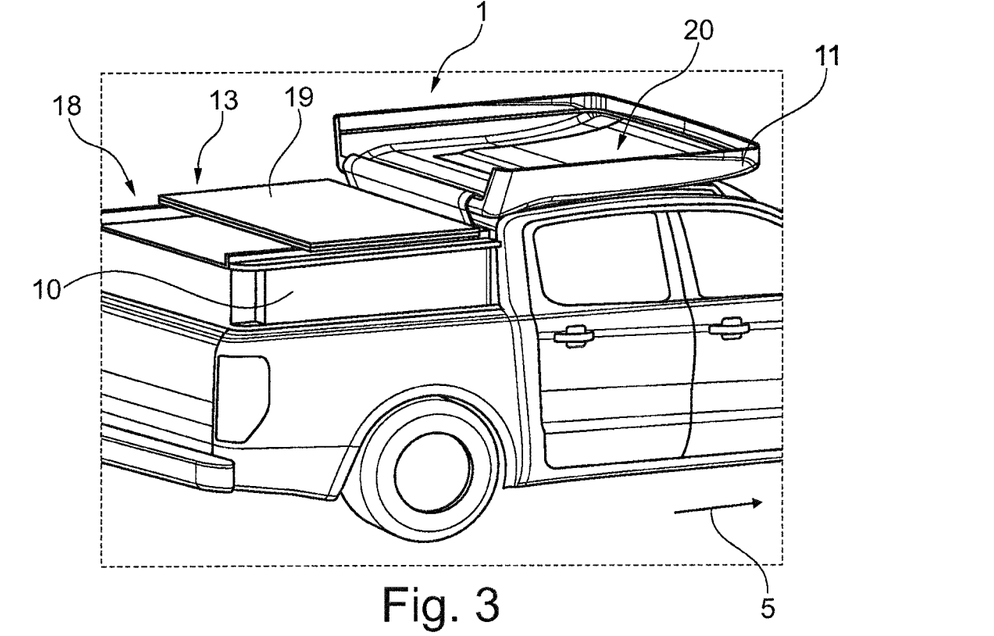
FIG. 3 is a schematic representation of one cutout view of an embodiment of a pickup truck in another intermediate position.

FIG. 3 shows in another schematic representation a cutout view of the pickup truck 1 in another intermediate position, in which the top part 11 of the covering element 8 is unfolded. For this, it may be provided that the top part 11 is hinged to the covering element 8.

The present invention, in particular, provides that the top part 11 can be unfolded and lying on at least a section of the roof 4.

This makes it possible to use the surface of the roof 4 as a support surface for the top part 11. Thus, the surface of the roof 4 can be used as a living or sleeping area when so required. As compared to a cargo area designed exclusively as the living or sleeping area, an overall enlarged living or sleeping area can be provided by additionally using the roof 4.

Figure 4:
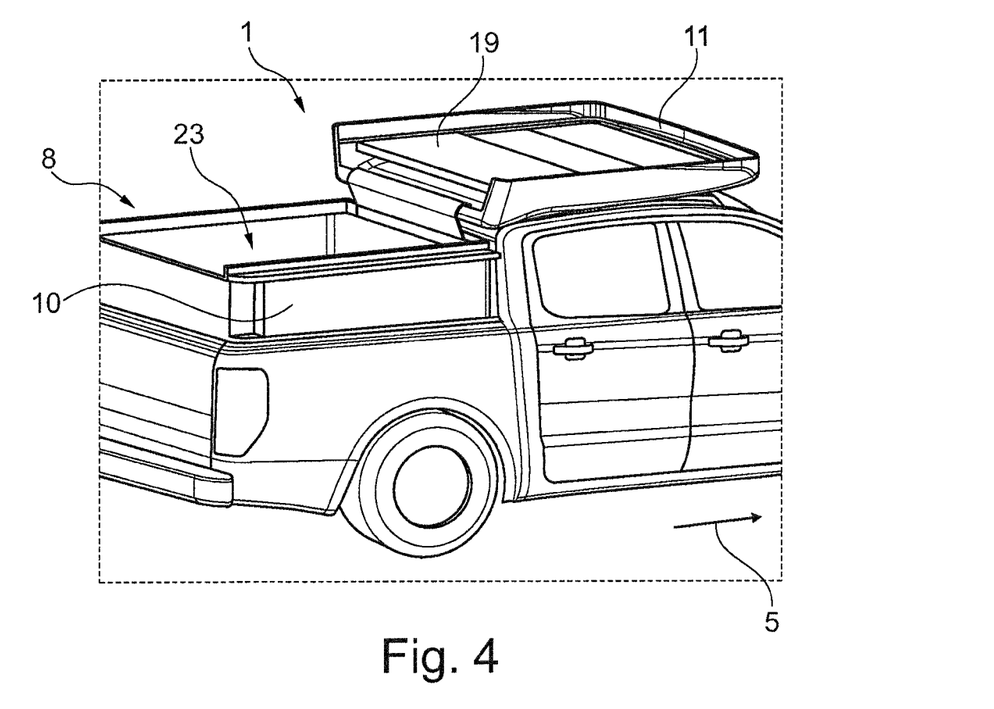
FIG. 4 is a schematic representation of one cutout view of the pickup truck represented in FIG. 3 in another intermediate position.

Furthermore, it is evident from FIGS. 3 and 4 that the covering element 8 comprises a support mechanism 19. This support mechanism 19 is then accessible, in particular, when the top part 11 is in the unfolded condition (see FIG. 4).

The present invention as represented may provide that the support mechanism 19 is connected to the top part 11. Preferably, it is provided that the support mechanism 19 is connected to the top part 11 in foldable manner.

The present invention may also provide that the support mechanism 19 can be folded into an inside 20 of the top part 11 (see FIG. 4). In advantageous manner, it is especially provided herein that the support mechanism 19 has a multiple part configuration, preferably is configured as a two or three-part support mechanism 19, which in the collapsed condition can be accommodated or stowed in space-saving manner in the covering element 8. In the unfolded condition (see FIG. 4), the support mechanism 19 may be viewed as a floor element, which can be arranged in the top part 11.

In not otherwise represented manner, a further support mechanism can be additionally designed and connected to existing support mechanism 19, 19' (FIG. 4) so that an enlargement of a surface formed by the support mechanism 19, 19' can be achieved. Preferably, this further support mechanism is foldable in design.

Figure 5:
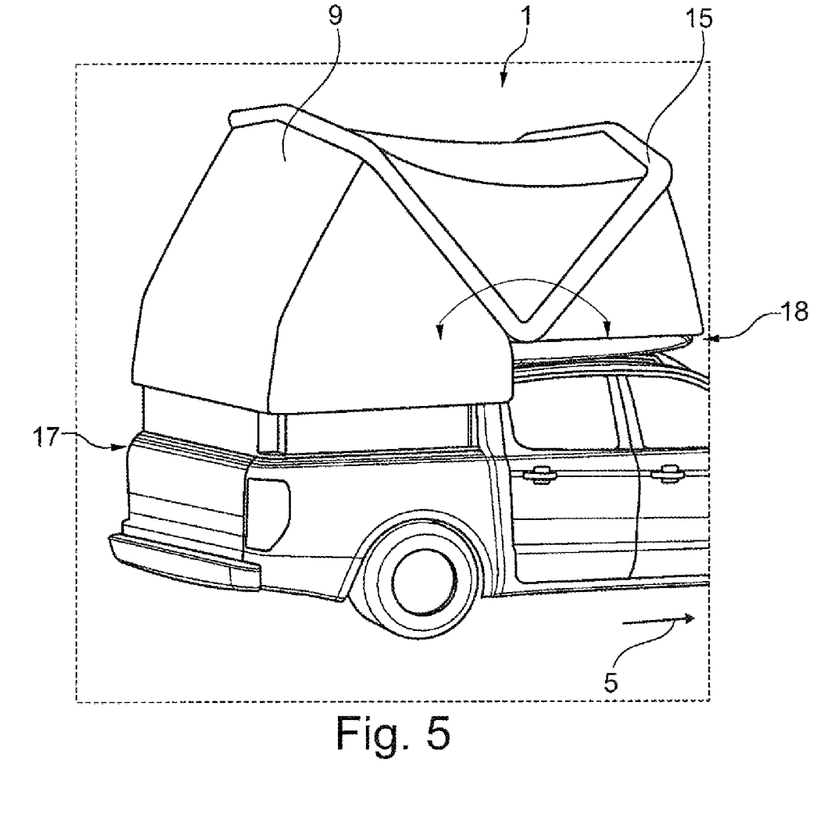
FIG. 5 is a schematic representation of one cutout view of a pickup truck in a position of use.

FIG. 5 shows that the covering element 8 comprises a tent 9. The tent 9 here is designed as an inflatable tent 9. It may also be provided that the tent 9 is designed as an unfoldable tent with poles, or as a combination, i.e., as an unfoldable and inflatable tent.

In the present case, the tent 9 comprises at least one fluid channel 15, especially an air channel, which is configured as a statically relevant bracing of the tent 9. This should be interpreted as meaning that the tent 9 is designed to be load-bearing without the use of poles, such as tent poles, etc. The fluid channel may be designed as a single-chamber system or a multiple-chamber system.

This may also be interpreted as meaning that the tent 9 is designed free of rigid static structures. By a rigid static structure is meant, e.g., a tent pole system.

Furthermore, FIG. 5 shows that the tent 9 is arranged on at least two levels 17, 18. One level 17 is formed here by the cargo area 2 and one level 18 by the roof 4. The levels 17 and 18 have a height offset, such that level 18 is situated above level 17.

The present invention in this respect may also be understood to mean that level 18 is formed by the roof 4 or the top part 11, wherein the top part 11 in an unfolded condition is partly lying on the roof 4, i.e., connected to it.

FIGS. 4 and 5 also furthermore show that the covering element 8 has a top side 14, the top side 14 being arranged preferably foldably on the roof 4, such that the tent 9, the roof 4 and the cargo area 2 can be spatially interconnected with each other.

Such a spatial connection of roof 4 and cargo area 2 by means of a tent 9 can also be interpreted as meaning that a living or sleeping space is formed by the tent 9, which comprises a surface of the roof 4 and a surface of the cargo area 2.

Such a condition, as represented in FIG. 5, may be understood as being the condition of use of the pickup truck as a residential vehicle, camper, motorhome, etc. Thus, the present invention proposes that a pickup truck 1 comprises an inflatable tent 9 in order to provide a residential vehicle, camper, motorhome, etc., which tent can preferably be arranged in a receiving space of a covering element 8 on a cargo area 2 of the pickup truck 1.

Such an inflatable tent 9 can be set up and torn down especially quickly and easily. By contrast with a pickup truck having a rigid living cabin, the tent is especially light and compact and can thus be removed with no major effort from the pickup truck 1 or the cargo area 2. Thus, a customary pickup truck 1 can be especially easily and quickly retrofitted as a residential vehicle, camper, motorhome, etc.

The covering element 8 is shown in schematic representation in FIG. 6. It is evident from FIG. 6 that the covering element 8 comprises a receiving space 23. For clarity, no tent comprised by the covering element 8 in the receiving space 23 is shown.

It is also evident from FIG. 6 that the covering element 8 comprises side walls 10, 13 and a top part 11.

The side walls 10, 13 have a liftable or telescopic design. Thus, e.g., a height offset can be adjusted between two levels 17, 18 (see FIG. 5).

In one embodiment, it may be provided that the side walls are each arranged in guides, from which they are extendably arranged (not shown). Such guides may also be interpreted as being a tunnel.

Preferably, it may be provided that the side walls are arranged inside the guides, where inside may be interpreted as meaning that the side walls are arranged in the area of the cargo area 2 and within the lateral boundaries 6, 7 (see FIGS. 1 and 2).

It can also be possible for one inner wall 29 and one outer wall 30 of the covering element 8 to form a receiving space, from which the side wall 13 can extend out or into which the side wall 13 can be retracted. Accordingly, the side wall 10 is also arranged in extending manner between the inner wall 29' and the outer wall 30', which likewise form a receiving space (see FIG. 6). The movability can be made possible here, for example, by the lifting mechanism 12.

The side walls 10, 13 are preferably made from a rigid or firm material, so that they have a correspondingly stable configuration.

The covering element 8 further comprises a base element 22 and a lifting mechanism 12, by which the side walls 10, 13 can be erected.

Furthermore, it is shown that the covering element 8 comprises a damping mechanism 16. This damping mechanism 16 is situated in the area of the top side 14 of the covering element 8. Insofar as the top side 14 is in an opened condition (e.g., see FIG. 4), the damping mechanism 16 can prevent the roof 4 from being damaged, e.g., scratched, by the top side 14.

This may also be the case, in particular, when the pickup truck has no railing arranged on the roof Thus, no railing is necessary when a damping mechanism is present. This may result in a substantial cost advantage.

Advisedly, it may be provided that furniture, such as a table and seats, etc., (not shown) can be or are arranged in the covering element, when it is in the condition of use (see FIG. 5). A fastener not further represented may be provided in the covering element, for example, for securing furniture.

Furthermore, it may be possible for the covering element to have a separation means (not shown). It may be especially advantageous for the separation means to be designed as a flexible separation means, which in a condition of use can be taken down and is arranged in a volume space of the tent, such as to make possible the separation of a living area from a sleeping area.

The separation means may also be designed or provided so as to hold the tent in the covering element in the condition of use.

Figure 7:
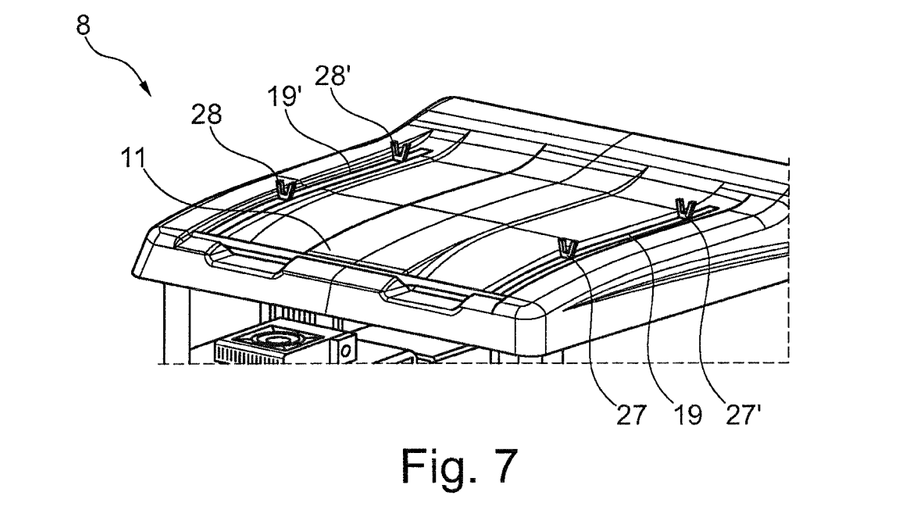
FIG. 7 is a schematic representation of one cutout view of a covering element.
Figure 8:
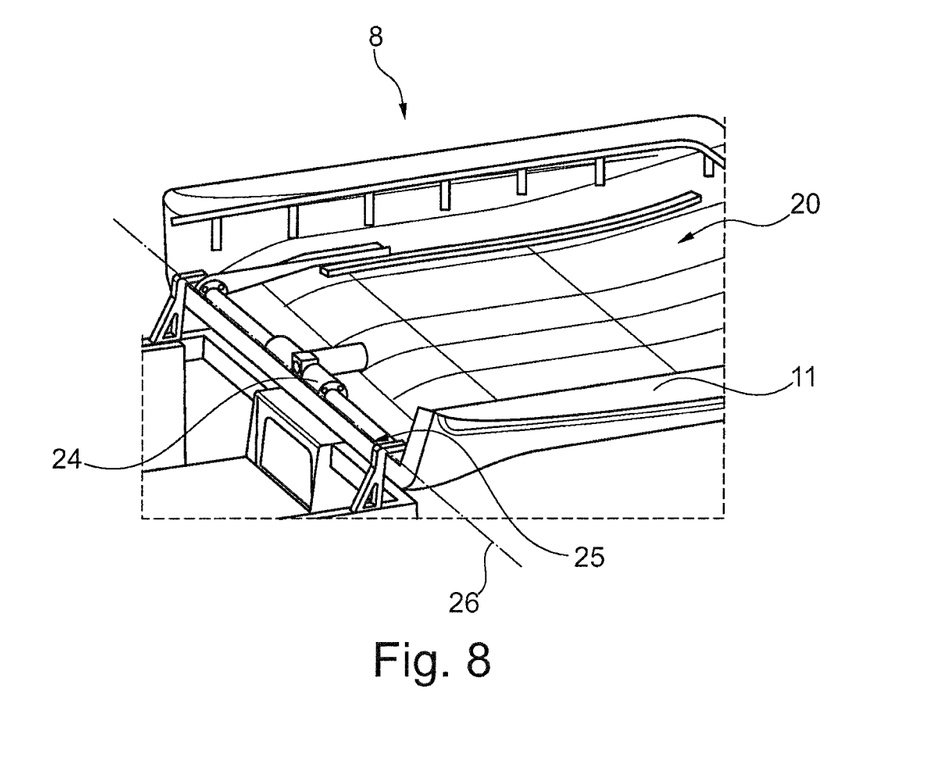
FIG. 8 is a further schematic representation of one cutout view of a covering element.

It is evident from FIG. 7 that the top part 11 comprises support mechanism 19, 19', being designed as profile rails, especially C-profile rails. The support mechanism 19, 19' are arranged on the outside of the top part 11.

The profile rails or the support mechanism 19, 19' may be configured or used as support mechanism for objects, such as bicycles (not shown). In this way, support mechanism 19, 19' with various uses can be provided. It may also be possible for the profile rails and the support mechanism 19, 19' to be designed or usable as support mechanism for a load beam, such as a roof beam.

The support mechanism 19, 19' are designed such that they can engage in form fit with a railing (see, e.g., FIG. 2). In this way, a stable and reliable holding of the top part becomes possible.

Furthermore, in order to be able to make possible a stable fastening of the top part 11, for example, on a railing of the pickup truck, it may be provided that the support mechanism 19, 19', which are fashioned as profile rails, especially as C-profile rails, each comprise fasteners 27, 27', 28, 28', wherein the fasteners 27, 27', 28, 28' are preferably designed as detent means which are movably, especially displaceably guided in the support mechanism 19, 19'.

The fasteners 27, 27', 28, 28' are designed to reach at least partly around a railing of a pickup truck and thus make possible a holding or a securing of the top part 11 to the railing of the pickup truck.

LIST OF REFERENCE NUMBERS

1 Pickup truck
2 Cargo area
3 Passenger compartment
4 Roof
5 Direction of travel
6 Lateral boundary
7 Lateral boundary
8 Covering element
9 Tent
10 Side wall
11 Top part
12 Lifting mechanism
13 Side wall
14 Top side (of covering element)
15 Fluid channel
16 Damping mechanism
17 Level
18 Level
19 Support mechanism
19' Support mechanism
20 Inside (of top part)
21, 31 Railing
22 Base element
23 Receiving space
24 Drive unit 25 Support
26 Pivot axis
27 Fastener
27' Fastener
28 Fastener
28' Fastener
29 Inner wall
29' Inner wall
30 Outer wall
30' Outer wall

The invention claimed is:

1. A vehicle comprising a cargo area and a passenger compartment with a roof, the cargo area being located behind the passenger compartment in the direction of travel, wherein the cargo area comprises lateral boundaries, wherein the cargo area has a covering element comprising a tent in a receiving space, wherein the tent can be inflated and/or unfolded, and wherein the covering element comprises a top part, at least a portion of which can be laid on the roof.

2. The vehicle as claimed in claim 1, wherein the covering element comprises at least side walls and a top part, wherein at least one side wall and the cargo area and/or at least one side wall and at least one lateral boundary are releasably connectible.

3. The vehicle as claimed in claim 1, wherein the covering element comprises at least one lifting mechanism.

4. The vehicle as claimed in claim 1, wherein the covering element comprises a top side arranged foldably on the roof, such that the tent, the roof and the cargo area are spatially interconnectible.

5. The vehicle as claimed in claim 1, wherein the covering element comprises at least one plastic.

6. The vehicle as claimed in claim 1, wherein the tent is secured by means of at least one fastener to the covering element and/or to the roof and/or to the cargo area.

7. The vehicle as claimed in claim 1, wherein the covering element comprises at least one damping mechanism made of elastic material.

8. The vehicle as claimed in claim 1, wherein the tent has at least one fluid channel which statically braces the tent.

9. The vehicle as claimed in claim 1, wherein the tent is free of rigid static structures.

10. The vehicle as claimed in claim 1, wherein the tent is arranged on at least two levels, wherein one level is defined by the cargo area and one level is defined by the roof and/or the at least two levels have a height offset.

11. The vehicle as claimed in claim 1, wherein the covering element comprises a foldable support mechanism.

12. The vehicle as claimed in claim 1, wherein the covering element comprises a drive unit, by means of which a top part of the covering element can swivel along a pivot axis, wherein the drive unit is arranged in a support, which is arranged on the pivot axis or parallel to the pivot axis.

13. A covering element for a vehicle, wherein the covering element is as claimed in claim 1.

14. The vehicle as claimed in claim 1, wherein the vehicle is a pickup truck.

15. The vehicle as claimed in claim 4, wherein the top part is releasably connectible to the roof.

16. The vehicle as claimed in claim 5, wherein the plastic material is thermoset plastic.

17. The vehicle as claimed in claim 6, wherein the fastener is a weatherstrip rail.

18. The vehicle as claimed in claim 7, wherein a top side of the covering element comprises at least one damping mechanism made of elastic material.

* * * * *